United States Patent
Locoge et al.

(10) Patent No.: US 9,574,909 B2
(45) Date of Patent: Feb. 21, 2017

(54) METHOD FOR DETERMINING A CLOSED TRAJECTORY BY MEANS OF A LASER AND A LASER LIGHT SENSOR AND APPARATUS FOR DETERMINING A CLOSED TRAJECTORY CURVE

(71) Applicant: Pruftechnik Dieter Busch AG, Ismaning (DE)

(72) Inventors: Pascal Locoge, Ismaning (DE); Christine Zocke, Riemerling (DE)

(73) Assignee: PRUFTECHNIK DIETER BUSCH AG, Ismaning (DE)

( * ) Notice: Subject to any disclaimer, the term of this patent is extended or adjusted under 35 U.S.C. 154(b) by 103 days.

(21) Appl. No.: 14/722,669

(22) Filed: May 27, 2015

(65) Prior Publication Data

US 2015/0345999 A1 Dec. 3, 2015

(30) Foreign Application Priority Data

May 28, 2014 (DE) .................. 10 2014 210 248

(51) Int. Cl.
*G01B 21/24* (2006.01)
*G01D 5/34* (2006.01)

(52) U.S. Cl.
CPC .............. *G01D 5/34* (2013.01); *G01B 21/24* (2013.01)

(58) Field of Classification Search
CPC .......... G01D 5/34; G01B 21/24; G01B 11/272
See application file for complete search history.

(56) References Cited

U.S. PATENT DOCUMENTS

| 6,434,849 | B1 | 8/2002 | Hermann | |
|---|---|---|---|---|
| 7,242,465 | B2 * | 7/2007 | Lacko | G01B 11/272 33/412 |
| 8,037,615 | B2 * | 10/2011 | Glaser | G01B 11/272 33/286 |
| 9,146,098 | B2 * | 9/2015 | Sansom | G01B 11/272 |
| 9,146,101 | B2 * | 9/2015 | Canu | G01B 11/272 |
| 2002/0129504 | A1 | 9/2002 | Lysen | |
| 2014/0139882 | A1 | 5/2014 | Katoh | |

FOREIGN PATENT DOCUMENTS

| DE | 3911307 A1 | 10/1990 |
|---|---|---|
| DE | 19506471 A1 | 8/1996 |
| DE | 19949834 A1 | 4/2001 |
| DE | 10109462 A1 | 9/2002 |
| DE | 10138831 A1 | 2/2003 |
| DE | 10142462 A1 | 3/2003 |
| DE | 10236555 A1 | 2/2004 |
| DE | 102004024398 A1 | 12/2005 |
| DE | 112004000113 T5 | 10/2013 |
| DE | 102012022487 A1 | 5/2014 |

* cited by examiner

*Primary Examiner* — Tony Ko
(74) *Attorney, Agent, or Firm* — Barlow, Josephs & Holmes, Ltd.

(57) ABSTRACT

The invention relates to a method for determining a closed trajectory curve (10) by a laser (12) and a laser light sensor (14) having a flat field of view (16), which includes the steps A to G, as well as an apparatus (36) for determining a closed trajectory curve (10).

10 Claims, 7 Drawing Sheets

METHOD FOR DETERMINING A CLOSED TRAJECTORY BY MEANS OF A LASER AND A LASER LIGHT SENSOR AND APPARATUS FOR DETERMINING A CLOSED TRAJECTORY CURVE

BACKGROUND OF THE INVENTION

The present invention relates to a method for determining a closed trajectory curve by means of a laser and a laser light sensor having a flat field of view as well as an apparatus for determining a closed trajectory curve.

Methods and apparatuses of the kind mentioned in the introduction are used, in particular, for apparatuses and methods by means of which any existing misalignment of two shafts that are connected to each other by a coupling can be determined. Such misalignments, that is, deviations from the situation in which the axes of rotation or central axes of shafts that are connected to each other via the coupling are aligned, often lead to undesired vibrations during operation of the apparatus having the two shafts.

Methods and apparatuses for determining misalignment are known, for example, from DE 195 06 471 A1, DE 102 36 555 A1, DE 101 42 462 A1, DE 101 38 831 A1, and DE 39 11 307 A1.

Generally known from DE 199 49 834 A1 is a method for determining the alignment of a cylindrical body with respect to a reference direction.

The use of an angle sensor in the automobile branch for determining a direction of travel is known from DE 10 2004 024 398 A1 and the use of a magnetic sensor for determining the linear position of a movable element is known from DE 11 2004 000 113 T5.

It is known from DE 102 36 555 A1, for example, how to use at least one flat field of view of a laser light sensor together with a laser for determining the misalignment of two shafts that are connected to each other via a coupling on the basis of elliptical trajectory that is traced on the at least one flat field of view by the laser light spot of the laser light beam and is described on the field of view during rotation of the first or second shaft when the laser or the field of view is linked to at least one of the two shafts in a rotationally fixed manner and the laser beam is directed onto the field of view.

In order to determine any existing misalignment from the determined trajectory curve, which generally takes the shape of an elliptical trajectory, not only the X coordinates and Y coordinates of the laser light spot are recorded, but, in addition, also the angle of rotation of the first or second shaft relative to a reference angle value or a predetermined angular position of the first or second shaft. For measurement of the angle of rotation determined from the angular position or the reference value, resort is generally had to an angle measurement instrument, such as an inclinometer, which enables the measurement of any inclination relative to the direction of gravitational force.

The measurement of the angle of rotation for determination of the angular position of the respective ellipse described by the laser light spot functions with high accuracy when shafts of machines that are essentially horizontally aligned are to be aligned. For the determination of any existing misalignment of essentially vertically aligned shafts, an inclinometer cannot be used or cannot be used with sufficient accuracy owing to the principle of measurement. This is correspondingly also the case for unstable floors, that is, when shafts that are to be aligned are situated on a ship.

SUMMARY OF THE INVENTION

The problem of the invention is to provide a method and an apparatus that enables any misalignment of two shafts connected to each other via a coupling to be determined with high accuracy, even in situations in which a measurement of the angle of rotation is not possible or is not possible with sufficient accuracy.

This problem is solved by a method of the present invention.

The method according to the invention relates to a method for determining a closed trajectory curve by means of laser and a laser light sensor having a flat field of view.

The field of view has a coordinate system with an X coordinate axis and a Y coordinate axis at a right angle to the X coordinate axis, with the laser light sensor being set up so as to record, on the field of view, the X coordinate and Y coordinate of the position of the laser light spot of the impinging laser light beam of the laser on the field of view or with the laser light sensor being set up so as to record the X coordinate and Y coordinate of the position of the laser light spot that is formed on the field of view when the laser light beam of the laser impinges on the field of view during irradiation.

The laser light sensor can be any laser light sensor furnished with a flat field of view. Especially preferably, it is a laser light sensor that has a plurality of line sensors—for example, like the line sensors utilized in digital photography cameras—for creation of the field of view. The X coordinates and Y coordinates recorded by the laser light sensor can be fed in the form of analog or digital signals via a signal transmission path—also wirelessly—to an analysis device, for example, such as a computer, for example, in the form of a laptop or a tablet, for example, for further analysis.

The X coordinates and Y coordinates, mentioned above and below, of the position of the laser light spot of the laser light beam impinging on the field of view or of the laser light spot formed on the field of view during irradiation with the laser light beam are the coordinates of a position in the form of a point, although the laser spot always has an area extension on the field of view. The X coordinates and Y coordinates of the position of the laser light spot refer above and below always to the coordinates of a point, which can be determined from derivation of the area and/or the brightness distribution of the laser light spot on the area. In particular, the point can be, for example, the center of gravity of the area of the laser light spot. The determination or calculation of the point can preferably be performed in an automated manner by means of a computational apparatus, such as, for example, a computer, on the basis of the digital and/or analog signals that are assigned to the respective laser light spot and are emitted by the laser light sensor.

The method includes the following steps:

A) Rotationally fixed linking of the laser to a first shaft, which is connected to a second shaft via a coupling, so that a rotation of the first shaft is transmitted to the second shaft and vice versa;

B) Rotationally fixed linking of the field of view to the second shaft, with the field of view being linked to the second shaft such that the Y coordinate axis and the X coordinate axis are oriented at essentially a right angle with respect to the axis of rotation of the second shaft;

C) Alignment of the laser such that the laser light beam generated by the laser is aligned parallel to the axis of rotation of the first shaft and can impinge on the field of view;

D) Rotation of the first or second shaft in a predetermined direction of rotation by at least 90 degrees and irradiation of the field of view with the laser light beam of the laser during the rotation;

E) Recording of the X coordinates and Y coordinates of at least three positions or of at least three distinct or different positions of the laser light spot on the field of view by the laser light sensor, said positions being assumed on the field of view by the laser light spot during the rotation in step D;

F) Determination of the temporally first recorded X coordinate and the temporally first recorded Y coordinate and assignment of a predetermined value of the angle of rotation to the temporally first recorded X coordinate and to the temporally first recorded Y coordinate; and G) Determination of the closed trajectory curve by means of the X coordinates recorded in step (E) and/or the Y coordinates recorded in step (E);

wherein, in step (G), a plot of the trajectory curve is further determined on the basis of the recorded X coordinates and/or the recorded Y coordinates, said plot being parameterized by the angle of rotation of the first or second shaft that, starting from the predetermined value of the angle of rotation, is measured in the direction of the predetermined direction of rotation.

Assignment of the letters A to G to the steps is not to be understood as binding them to a temporal sequence. Thus, the steps A, B, and C, for example, can be traversed in any sequence, in particular also simultaneously or essentially simultaneously. The step G is performed after step F and the step F after step E.

In step A, the laser is linked in a rotationally fixed manner to a first shaft, which is connected to a second shaft via a coupling, so that a rotation of the first shaft can be transmitted to the second shaft and vice versa.

In step B, the field of view is linked in a rotationally fixed manner to the second shaft, with the field of view being linked to the second shaft in such a way that the Y coordinate axis and the X coordinate axis are oriented at essentially a right angle with respect to the axis of rotation of the second shaft or are oriented at a right angle with respect to the axis of rotation of the second shaft. An essentially right-angled orientation or alignment is to be understood here as meaning a deviation from a perfect right-angled alignment that is smaller than 5 degrees, preferably smaller than 1 degree.

That two axes have a right-angled or essentially right-angled orientation or alignment with respect to each other obviously does not presume that these axes must always intersect. When the two axes do not intersect, they form a common point of intersection by way of a translational displacement and can then enclose a right angle or essentially right angle.

In step C, the alignment of the laser occurs in such a way that the laser light beam that can be generated by the laser is aligned parallel to the axis of rotation of the first shaft and can impinge on the field of view, it being especially preferred, in particular for revolutions of 360 degrees, that, in step A and B, the laser and the field of view are linked to the first shaft or to the second shaft in a rotationally fixed manner in such a way that the laser can be aligned parallel or essentially parallel to the axis of rotation of the first step in such a way that the laser light beam that can be generated by the laser can impinge on the field of view in any rotational position or in every possible rotational position of the first or second shaft.

The linking of the laser or field of view to the first shaft or to the second shaft in a rotationally rigid manner is known from DE 102 36 555 A1 and represents a preparatory measure for determining any existing misalignment of the two shafts with respect to each other in the way described in DE 102 36 555 A1.

In order to determine the angular position of a closed trajectory curve in the form of an elliptical trajectory or circular trajectory or to determine a plot of the elliptical trajectory or circular trajectory on the basis of the recorded X coordinates and/or Y coordinates of the laser light spot on the field of view, said plot being parameterized by the angle of rotation of the first or second shaft, the angle of rotation is measured in the method known from DE 102 36 555 A1, for example, during rotation by means of a rotational angle measurement instrument or gauge, such as, for example, an inclinometer, this entailing the drawback that the measurement of the angle of rotation—owing to the measurement principle of the inclinometer or of any inclination measurement device—is not possible during the determination of a misalignment of essentially vertically aligned shafts or is not possible with sufficient accuracy. This is correspondingly also the case for unstable floors, that is, when the shafts to be aligned are situated on a ship, for example.

In contrast to the above known solutions, the method according to the invention enables the determination of a misalignment of two shafts, which are connected to each other via a coupling, with high accuracy even in situations in which a measurement of the angle of rotation is not possible or is not possible with sufficient accuracy. This is because, in step G of the method according to the invention, a plot of the trajectory curve is determined on the basis of the X coordinates and/or Y coordinates recorded in step E, said trajectory curve being parameterized by the angle of rotation of the first or second shaft, which, starting from the predetermined value of the angle of rotation (compare step F), is measured in the direction of the predetermined direction of rotation. This means that, in an advantageous manner, a measurement of the angle of rotation need not be performed when the X coordinates and Y coordinates of the positions of the laser light spot on the flat field of view are recorded. This is because the angular position or the parameter plot of the closed trajectory curve or the curved closed trajectory curve, which is preferably an ellipse or a circle, can be determined advantageously by using the coordinates recorded in step E, the predetermined value of the angle of rotation, which is assigned to the first temporally measured X coordinate and the first temporally recorded Y coordinate, and the predetermined direction of rotation. Here, the direction of rotation can be predetermined, in particular, by the chosen direction of rotation of the respective device, such as, for example, a device in the form of a drive device comprising the two shafts. In step D, it is merely necessary to ensure that a rotation by at least 90 degrees occurs, which can be realized in any way even without an inclinometer measurement.

The trajectory curve, which is determined advantageously by the method according to the invention without measurement of the angle of rotation, can then be used advantageously in the manner known from DE 102 36 555 A1, for example, for determining any misalignment of two shafts, so that the method according to the invention can also enable advantageously the determination of a misalignment of two shafts that are connected via a coupling with high accuracy even in situations in which a measurement of the angle of rotation is not possible or is not possible with sufficient accuracy.

It is provided in step E of the method according to the invention that the X coordinates and Y coordinates of at least three positions of the laser light spot or of at least three different positions of the laser light spot on the field of view are recorded by the laser light sensor. Especially preferably, the X coordinates and Y coordinates of substantially more positions, which the laser light spot assumes on the field of view during the rotation in step D, can also be determined. The number of positions can thus be, for example, even ten or twenty or more than ten or twenty, so that the determination of the closed trajectory curve can be based on a large number of positions of the laser light spot, this being associated with a very precise accuracy in recording or determining the trajectory curve, which can be determined in known way, for example, by curve fitting to the recorded X coordinates and Y coordinates.

The predetermined value of the angle of rotation according to step F of the method according to the invention is preferably zero degrees, this entailing the advantage that it is possible to measure the angle of rotation (compare also step G) in a simple and practical manner from this predetermined angle of rotation, serving as a kind of initial angle value or reference angle value of the angle of rotation. Obviously, any other value of the angle of rotation can be assigned to the first temporally recorded X coordinate and the first temporally recorded Y coordinate. The predetermined value of the angle of rotation can be defined or set at will so as to measure the angle of rotation starting from it as a kind of fixed reference.

In step D, in an especially preferred embodiment of the method according to the invention, the first or second shaft is rotated by 360 degrees and, in step E, the X coordinates and Y coordinates of at least sixteen positions of the laser light spot on the field of view are recorded, wherein, in step G, a closed trajectory curve, which is parameterized by the angle of rotation of the first and second shaft, is determined in the form of an ellipse or a circle and exclusively only the recorded Y coordinates or exclusively only the recorded X coordinates are used for determination of the parameterized trajectory curve.

This especially preferred embodiment is particularly advantageous in the case when, owing to measurement inaccuracies, which, in turn, can be due to play in the coupling connecting the two shafts to each other, for example, the recorded X coordinates or the recorded Y coordinates exhibit great variation, in particular in regard to a trajectory curve in the form of a circle or an ellipse that is determined by curve fitting to the recorded X coordinates and Y coordinates. It could also be shown by test series that, in spite of the existence of great variations in the X coordinates or the Y coordinates, a closed trajectory curve determined by means of this preferred embodiment would come very close to or advantageously deviate only very slightly from the trajectory curve that the laser light spot would describe on the flat field of view without the measurement inaccuracies.

For determination of this variation in the X coordinates or the Y coordinates, it is possible, for example, to determine for each recorded position of the laser light spot, in a known way, the distance of the position from the ellipse or the circle in the direction parallel to the X coordinate axis and/or the direction parallel to the Y coordinate axis—that is, the distance measured in a direction parallel to the X coordinate axis or Y coordinate axis—and to form a mean value of these distances.

If the variation of the X coordinates or Y coordinates is then too great or exceeds a predetermined amount, it is possible according to the above-described embodiment, by exclusively using the Y coordinates, when the X coordinates vary too strongly, or by exclusively using the X coordinates, when the Y coordinates vary too strongly, to create a closed curved trajectory curve, in the form of an ellipse or a circle, that comes very close to the trajectory curve that the laser light spot would describe on the flat field of view without the measurement inaccuracies and therefore can be employed advantageously for determining the alignment of the two shafts with respect to each other.

In this case, it may be especially preferred also to record the X coordinates and Y coordinates of substantially more than sixteen positions that the laser light spot assumes on the field of view during the rotation in step D. Thus, the number of positions can be, for example, also ten or twenty or thirty more than ten or twenty or thirty, so that the closed trajectory curve can be based on a very large number of positions of the laser light spot, this entailing a very precise accuracy in recording or determining the trajectory curve, which can be determined in a known way, for example, by curve fitting to the recorded X coordinates and Y coordinates.

Preferably, the determination of a parameterized trajectory curve in the form of an ellipse or a circle occurs exclusively on the basis of the recorded Y coordinates or exclusively on the basis of the recorded X coordinates by means of a function that is based on an ellipse equation, among other things, as is presented below by way of example for the case in which exclusively only the recorded Y coordinates are employed.

Thus, the recorded Y coordinates can be initially scaled and normalized according to the following relation:

$$Y_{normalized} = \frac{y - \left(\frac{ymax + ymin}{2}\right)}{\left(\frac{ymax - ymin}{2}\right)}$$

Furthermore, by using the equation for a centered and rotated ellipse $$Y_{max} = a \cos t \sin \theta_0 + b \sin t \cos \theta_0$$

and, on the basis of the above normalization, the following relation can be derived:

$$Y_{max} = \sqrt{a^2(\sin\theta_0)^2 + b^2(\cos\theta_0)^2}$$

The centered or scaled and normalized measured values can then be expressed in the form of the following sine function:

$$\frac{y}{y_{max}} = \frac{y}{\sqrt{a^2(\sin\theta_0)^2 + b^2(\cos\theta_0)^2}} = \sin(\varphi_0 + t).$$

Accordingly, by means of the relation $$\varphi = \sin^{-1}\left(\frac{y - \left(\frac{ymax + ymin}{2}\right)}{\left(\frac{ymax - ymin}{2}\right)}\right)$$

an angle of rotation $\varphi$ of the first or second shaft can be assigned to each recorded Y coordinate of the position of the laser light spot on the flat field of view, said angle of rotation $\varphi$ being measured starting from the predetermined value of the angle of rotation (compare step F of the method according to the invention) in the direction of the predetermined direction of rotation, which can be measured, for example, by any measuring apparatus suitable for this—such as, for example, an inclinometer—so that the points or positions that are created in this way describe a closed curved trajectory curve in the form of an ellipse (or a circle, because the circle is a special case of an ellipse), which is parameterized by the angle of rotation $\phi$, wherein, in the last relation, a scaling between 0 degrees and 360 degrees is to be performed, because the arcsine function is defined only in the range of values [−90 degrees, 90 degrees].

In step D, in another preferred embodiment of the method according to the invention, the first or second shaft is rotated by at least 90 degrees and by less than 360 degrees or by essentially 180 degrees or by 180 [degrees], wherein, in step D, the X coordinates and Y coordinates of at least three positions of the laser light spot on the field of view are recorded, wherein, in step G, a closed trajectory curve in the form of an ellipse or a circle is determined by curve fitting to the recorded X coordinates and Y coordinates, and wherein, for determination of the parameterized plot of the trajectory curve, the angle of rotation measured from the predetermined value of the angle of rotation in the direction of the predetermined direction of rotation is assigned to each point on the trajectory curve.

The above further preferred embodiment is of advantage, in particular, when, owing to existing spatial circumstances, a rotation of 360 degrees is not possible; this embodiment is also used for determining the parameterized trajectory curve only when the recorded X coordinates or the recorded Y coordinates do not exhibit too great a variation due to measurement inaccuracies, in particular in regard to a trajectory curve in the form of a circle or an ellipse determined by curve fitting to the recorded X coordinates and Y coordinates—in regard to the variations, compare to this also the above statements for the especially preferred embodiment, in which, in step D, the first or second shaft is rotated by 360 degrees.

In particular, it could be shown by test series that, in spite of the existence of variations in the X coordinate or Y coordinate, a closed trajectory curve in the form of a circle or an ellipse is determined or can be determined by means of the further preferred embodiment, said closed trajectory curve coming very close to or advantageously deviating only very slightly from the trajectory curve that the laser light spot would describe on the flat field of view without measurement inaccuracies, so that the determined closed trajectory curve can then be used advantageously in the way known from DE 102 36 555 A1, for example, for a precise determination of any misalignment of two shafts.

Especially preferably, the steps E to G are performed in an automated manner, so that the method according to the invention can be integrated advantageously in a running production process, for example, in which a routine monitoring of the alignment of two shafts that are connected to each other through a coupling is desired or necessary.

The apparatus according to the invention for determining a closed trajectory curve has a laser, a laser sensor having a flat field of view, and an analysis unit.

The flat field of view of the laser light sensor has a coordinate system with an X coordinate axis and a Y coordinate axis at a right angle to the X coordinate axis, with the laser light sensor being set up so as to record the X coordinate and the Y coordinate of the position of the laser light spot that can be formed on the field of view by the laser emitting a laser light beam impinging on the field of view.

The laser can be linked to a first shaft in a rotationally fixed manner, said shaft being connected via a coupling to a second shaft, so that a rotation of the first shaft can be transmitted to the second shaft and vice versa. The field of view can be linked to the second shaft in such a way that the Y coordinate axis and the X coordinate axis are oriented at a right angle or essentially at a right angle with respect to the axis of rotation of the second shaft. The laser can be aligned in such a way that the laser light beam that can be generated by the laser is aligned parallel to the axis of rotation of the first shaft and can impinge on the field of measurement.

Preferably, a control unit can be provided, with it being possible for the control unit to control the first or second shaft in such a way that the first shaft or second shaft—for example, starting from a predetermined rotational position of the first or second shaft—can be rotated in a predetermined direction of rotation and with it being further possible also for the control unit to activate the laser for irradiation of the field of view with the laser light beam of the laser during rotation of the first or second shaft. In particular, this control unit can further be set up so as to activate the laser light sensor for recording the X coordinates and Y coordinates of the positions of the laser light spot of the laser light beam on the field of view, said positions of the laser light spot being assumed on the field of view when the first or second shaft is rotated by at least 90 degrees and by less than 360 degrees or by 180 degrees or by 360 degrees.

The analysis unit is set up so as to determine the temporally first recorded X coordinate and temporally first recorded Y coordinate from the X coordinates and Y coordinates of at least three positions of the laser light spot that the laser light spot assumes on the field of view during rotation, when the first or second shaft is rotated by at least 90 degrees, and to assign these temporally first recorded coordinates to a predetermined value of the angle of rotation. The analysis unit is also set up so as to determine a closed trajectory curve from the recorded X coordinates and/or the recorded Y coordinates, and the analysis unit is further set up so as to determine a plot of the trajectory curve on the basis of the recorded X coordinates and/or Y coordinates, said trajectory curve being parameterized by the angle of rotation of the first and second shaft that is measured starting from the predetermined value of the angle of rotation in the direction of the predetermined direction of rotation.

The apparatus according to the invention is characterized in particular in that the analysis unit is set up so as to determined a plot of the trajectory curve on the basis of the recorded X coordinates and/or Y coordinates, said trajectory curve being parameterized by the angle of rotation of the first and second shaft that is measured starting from the predetermined value of the angle of rotation in the direction of the predetermined direction of rotation.

Therefore, in analogy to the reasons already presented above in conjunction with the method according to the method, the determination of a misalignment of two shafts that are connected to each other via a coupling is made possible by means of the apparatus according to the invention with high accuracy even in situations in which a measurement of the angle of rotation is not possible or is not possible with sufficient accuracy.

In a preferred embodiment, the closed trajectory curve is an ellipse or a circle and the analysis unit is set up, for determination of the trajectory curve parameterized by the angle of rotation of the first or second shaft, so as to use exclusively only the Y coordinates recorded for a rotation of 360 degrees or exclusively only the X coordinates recorded for a rotation of 360 degrees of at least sixteen positions of the laser light spot, this entailing, in particular, the advantage already presented above in conjunction with the method according to the invention that, even for great variations in the X value or Y value, a closed trajectory curve is determined or can be determined, said trajectory curve coming very close to or advantageously deviating only very slightly from the trajectory curve that the laser light spot would describe on the flat field of view without the measurement accuracies. The determined closed trajectory curve can then be used advantageously in the way known from DE 102 36 555 A1, for example, for a precise determination of any misalignment of the two shafts.

In another preferred embodiment, the analysis unit is set up so as to determine a closed trajectory curve in the form of an ellipse or a circle by curve fitting to the X coordinates and Y coordinates, recorded when the first or second shaft is rotated by at least 90 degrees and by less than 360 degrees or by essentially 180 degrees, of at least three positions of the laser light spot, and the analysis unit is further set up, for determination of the parameterized plot of the trajectory curve, so as to assign the angle of rotation to be measured starting from the predetermined angle of rotation in the direction of the predetermined direction of rotation to each point, this entailing the advantages already presented above in conjunction with the method according to the invention.

BRIEF DESCRIPTION OF THE DRAWINGS

Exemplary embodiments of the invention will be explained in detail below on the basis of the attached drawing: Shown in the drawing are.

DESCRIPTION OF THE INVENTION

Figure 1A:
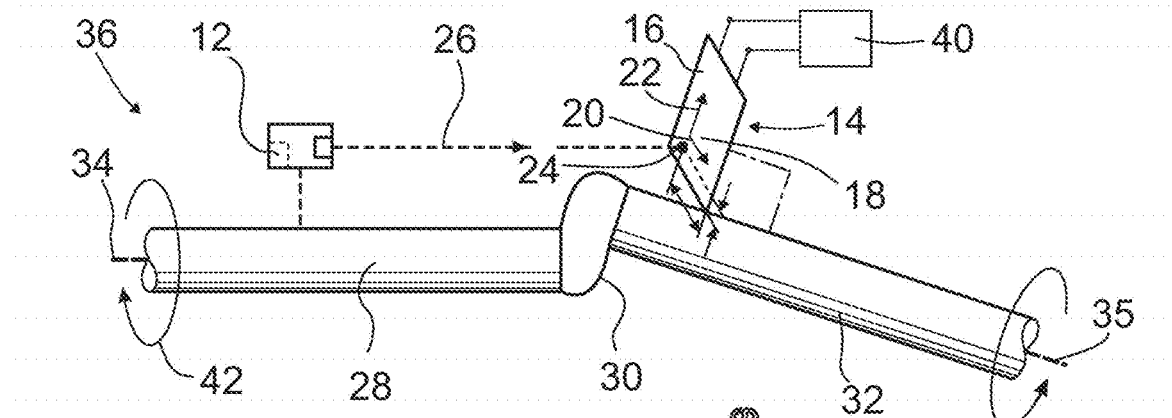
FIG. 1A a schematic illustration of an exemplary embodiment of an apparatus according to the invention, together with two shafts that are connected to each other via a coupling.

The apparatus 36 according to FIG. 1A for determining a closed trajectory curve comprises a laser 12, a laser light sensor 14 having a flat field of view 16, and an analysis unit 40.

The field of view 16 has a coordinate system 18 with an X coordinate axis 20 and a Y coordinate axis 22 that is at a right angle to the X coordinate axis 20.

The laser light sensor 14 is set up so as to record the X coordinate and Y coordinate of the position of the laser light spot 24 on the field of view 16 of the laser light beam 26 that can be generated by the laser 12 and impinges on the field of view 16.

The laser 12 can be linked to a first shaft 28 in a rotationally fixed manner, said shaft being connected to a second shaft 32 via a coupling 30, so that a rotation of the first shaft 28 can be transmitted to the second shaft 32 and vice versa.

The field of view 16 can be linked to the second shaft 32 in a rotationally fixed manner in such a way that the Y coordinate axis 22 and X coordinate axis 20 are oriented at essentially a right angle with respect to the axis of rotation 35 of the second shaft 32.

The laser 12 can be aligned in such a way that the laser light beam 26 that can be generated by the laser 12 is aligned parallel to the axis of rotation 34 of the first shaft 28 and can impinge on the field of view 16.

Figure 1D:
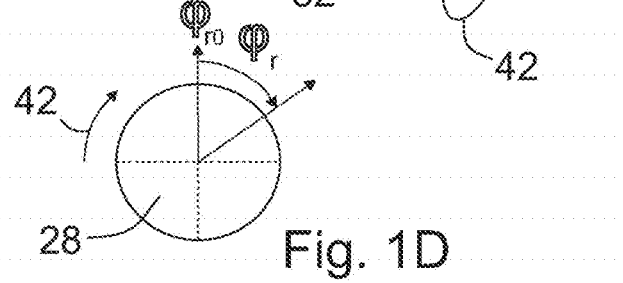
FIG. 1D a schematic front-end view of a shaft.

The first or second shaft 28, 32 can be controlled by manual rotation or manual actuation in such a way that the first shaft 28 or the second shaft 32 can be rotated in a predetermined direction of rotation 42—compare also FIG. 1D, which shows a schematic front-end view of the first shaft 28 from the left. Shown is also an angle of rotation $\phi_r$ of the first shaft 28, which is measured starting from a predetermined or defined value of the angle of rotation $\phi_{r0}$ in a magnitude of zero degrees in the direction of the predetermined direction of rotation 42.

The analysis unit 40 is set up so as to determine the temporally first recorded X coordinate and the temporally first measured Y coordinate from the X coordinates and Y coordinates, recorded when the first or second shaft is rotated by at least 90 degrees, of at least three positions of the laser light spot, which the light spot assumes on the field of view during rotation, and to assign these temporally first recorded coordinates to the predetermined value of the angle of rotation $\phi_{r0}$ in a magnitude of zero degrees.

Furthermore, the analysis unit is set up so as to determine a closed trajectory curve (10) from the recorded X coordinates and the recorded Y coordinates and, on the basis of the recorded X coordinates and/or Y coordinates, to determine a plot of the trajectory curve 10 (compare FIGS. 2 and 3), which is parameterized by the angle of rotation $\phi_r$ of the first or second shaft (28, 32), which is measured starting from the predetermined value of the angle of rotation $\phi_{r0}$ in a magnitude of zero degrees in the direction of the predetermined direction of rotation 42.

In the following, an exemplary embodiment of the method according to the invention will be explained on the basis of FIG. 1A.

The method to be explained for determining a closed trajectory curve 10 (compare FIGS. 2 and 3) by means of the laser 12 and the laser light sensor 14 having the flat field of view (16) comprises the following steps:

(A) Rotationally fixed linking of the laser 12 to the first shaft 28;

(B) Rotationally fixed linking of the field of view 16 to the second shaft 32, with the field of view 16 being linked to the second shaft 32 in such a way that the Y coordinate axis 22 and the X coordinate axis 20 are oriented at essentially a right angle with respect to the axis of rotation 35 of the second shaft 32;

(C) Alignment of the laser (12) in such a way that the laser light beam (26) that can be generated by the laser (12) is aligned parallel to the axis of rotation (34) of the first shaft (28) and can impinge on the field of view (16).

(D) Rotation of the first shaft 28 in the direction of the predetermined direction of rotation 42 by about 245 degrees and irradiation of the field of view 16 with the laser light beam 26 of the laser (12) during the rotation;

(E) Registration of the X coordinates and Y coordinates of the here more than 30 positions of the laser light spot 24 on the field of view 16 by the laser light sensor 14, said positions being assumed by the laser light spot 24 on the field of view 16 during rotation in step D;

(F) Determination of the temporally first recorded X coordinate and the temporally first recorded Y coordinate and assignment of the predetermined value of the angle of rotation $\phi_{r0}$ in a magnitude of zero degrees to the temporally first recorded X coordinate and to the temporally first measured Y coordinate; and (G) Determination of the closed trajectory curve 10 by means of the X coordinates recorded in step E and the Y coordinates recorded in step E, wherein, furthermore, a plot of the trajectory curve (10) is determined on the basis of the recorded X coordinates and Y coordinates, said trajectory curve being parameterized by the angle of rotation $\phi_r$ of the first shaft 28, which is measured starting from the predetermined value of the angle of rotation $\phi_{r0}$ in a magnitude of zero degrees in the direction of the predetermined direction of rotation 42.

In step G, the closed trajectory curve 10 (compare FIG. 2) is determined in the form of an ellipse by curve fitting to the recorded X coordinates and Y coordinates. For determination of the parameterized plot of the trajectory curve 10 (compare FIG. 3), the angle of rotation $\phi_r$ measured from the predetermined value of the angle of rotation $\phi_{r0}$ (compare FIG. 1D) in the direction of the predetermined direction of rotation 42 is assigned to each point 44 on the trajectory curve 10 (compare FIG. 2). The assignment occurs as described below.

Figure 2:
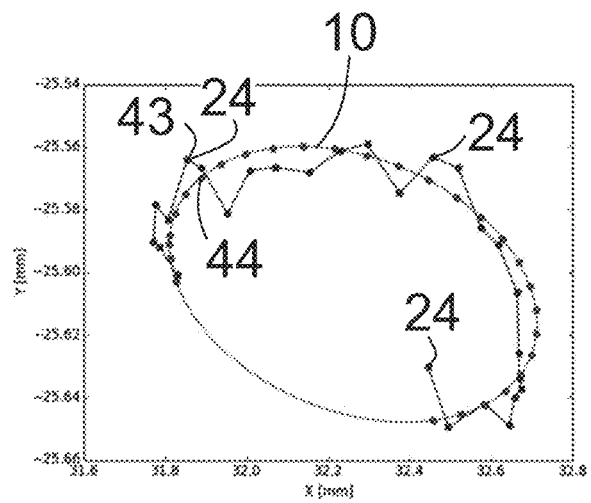
FIG. 2 a schematic illustration of laser light spots of a laser formed on a field of view together with an ellipse curve.

The initial angle $\phi_{r0}$ with an angle value of zero degrees is assigned to the position 43 of the laser light spot 24 on the field of view 16 that is defined or predetermined by the temporally first recorded X coordinate and by the temporally first recorded Y coordinate (compare FIG. 2). Furthermore, this position is assigned to the point 44 on the ellipse trajectory that has the smallest distance from the ellipse trajectory and is determined by curve fitting. The other positions of the laser light spot are also each assigned to the ellipse trajectory that has the smallest distance from the ellipse trajectory and is determined by curve fitting.

Figure 3:
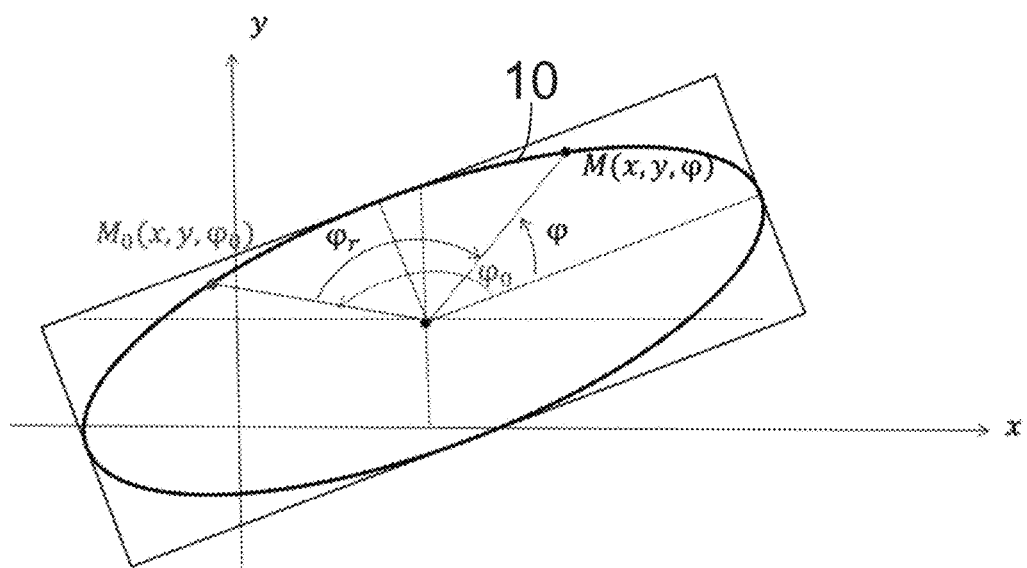
FIG. 3 a schematic illustration of a trajectory curve in the form of an ellipse, parameterized by an angle of rotation.

FIG. 3 highlights how, by way of example, furthermore, a point M (not the point 34 in FIG. 3, but rather the point M) is assigned to each recorded position of the laser light spot 24 on the ellipse, the angular position of which was initially not yet adjusted to the predetermined value of the angle of rotation $\phi_{r0}$ in a magnitude of zero degrees. For adjustment, the value $\phi0$ is to be subtracted from the angle value $\phi$ of the point M so as to determine the angle $\phi_r$ from which the value of the angle of rotation $\phi_{r0}$ is measured. The angle $\phi0$ is the calculated angle of the first measured point or the calculated angle of the position that is defined by the temporally first recorded X coordinate and by the temporally first measured Y coordinate.

In order to carry out the above method, the analysis unit 40 is set up so as to determine the closed trajectory curve 10 in the form of the ellipse by curve fitting to the X coordinates and Y coordinates recorded during rotation of the first shaft 28. Furthermore, the analysis unit 40 is set up, for determination of the parameterized plot of the trajectory curve 10, so as to assign the angle of rotation $\phi_r$ to be measured starting from the predetermined value of the angle of rotation $\phi_{r0}$ in the direction of the predetermined direction of rotation to each point of the trajectory curve 10.

Figure 1B:
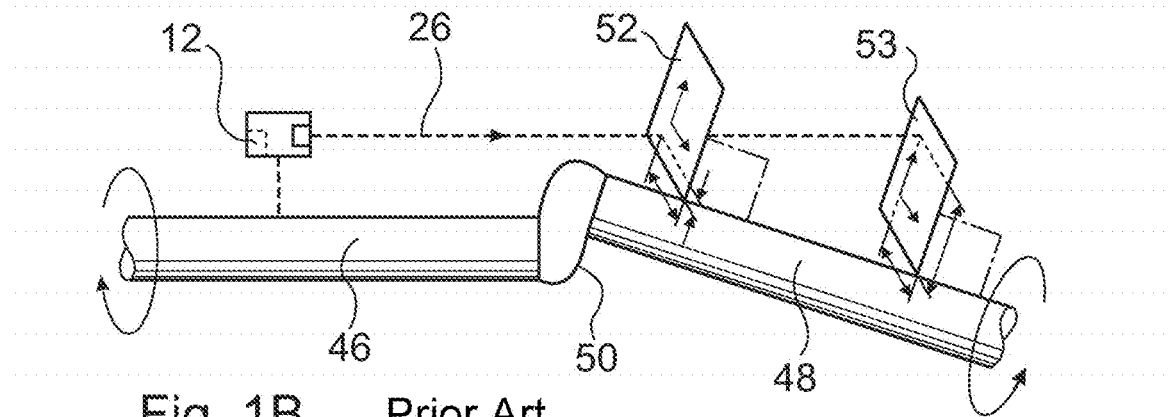
FIG. 1B, C a schematic illustration, respectively, of a known apparatus for determining the alignment of two shafts that are connected to each other via a coupling, together with the shafts and the coupling.
Figure 1C:
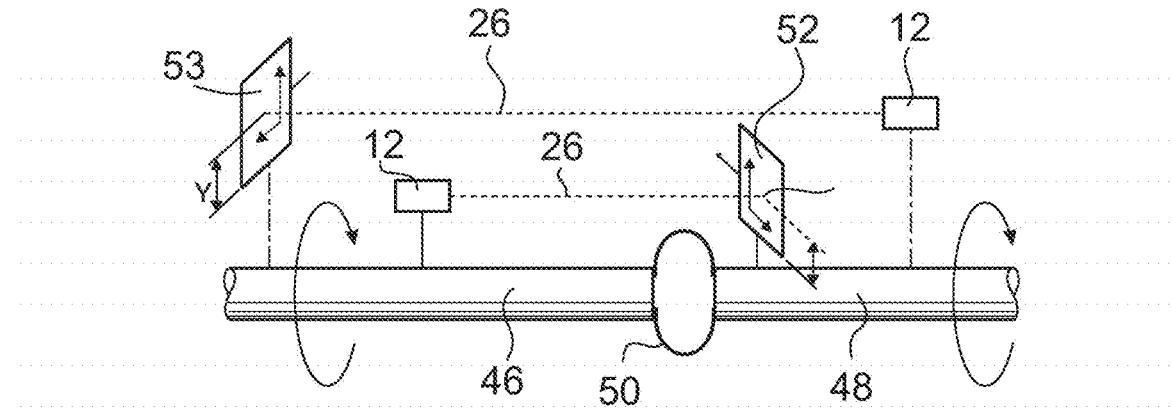
Figure 5:
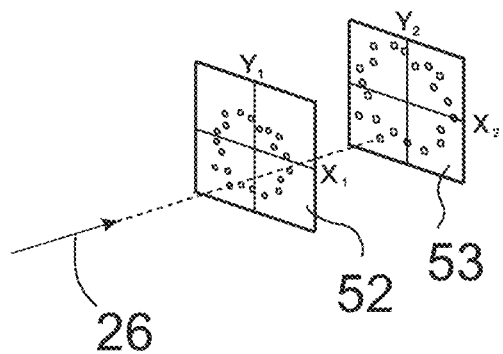
FIG. 5 a schematic illustration for highlighting a measurement with two fields of view by means of the apparatus according to FIG. 1B or FIG. 1C.
Figure 6:
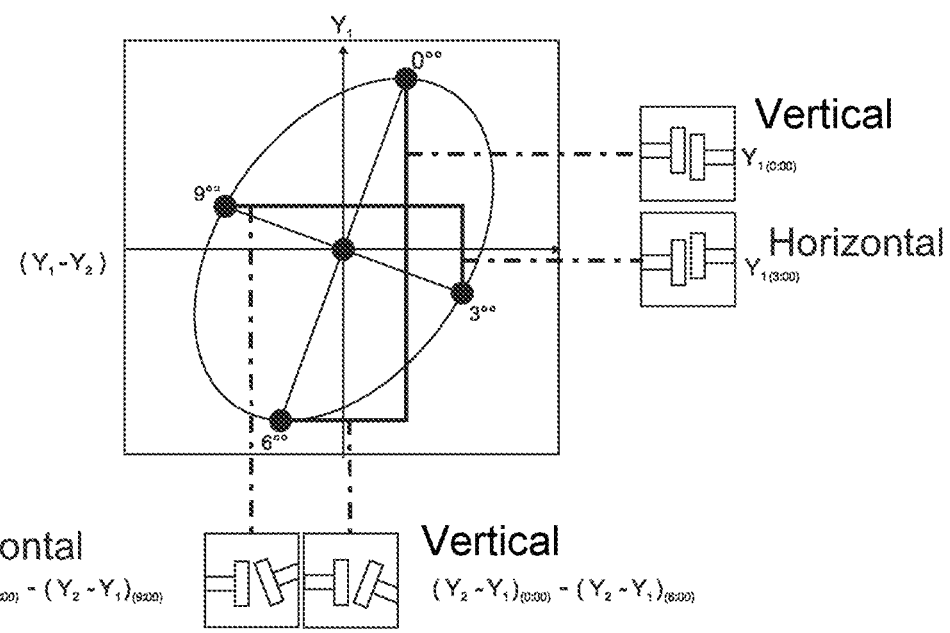
FIG. 6 a schematic illustration for highlighting the determination of the horizontal and vertical angular offset and parallel offset of two shafts on the basis of recorded coordinates of a laser light spot on two fields of view.

The known apparatuses illustrated in FIGS. 1B and C for determining the alignment of two shafts 46, 48, which are connected to each other via a coupling 50, use two respective fields of view 52, 53 for determination of the parallel and vertical parallel offset and horizontal offset, whereby, for this, as illustrated in FIG. 6, the respective Y1 coordinate of the field of view 52, is plotted over the difference Y2−Y1 parameterized by the angle of rotation (Y2 is the recorded Y coordinate of the field of view 53—compare also FIG. 5). In the known apparatus according to FIG. 1C, furthermore, an additional laser 12 is used.

Figure 4A:
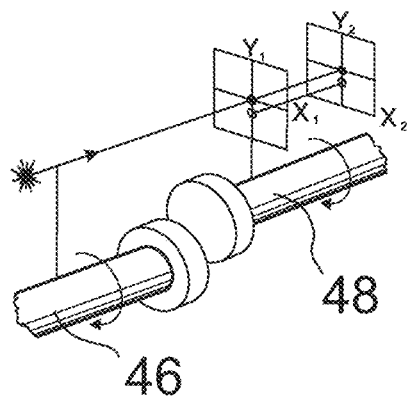
FIG. 4A, B a schematic illustration, respectively, for highlighting an offset of two shafts with respect to each other.
Figure 4B:
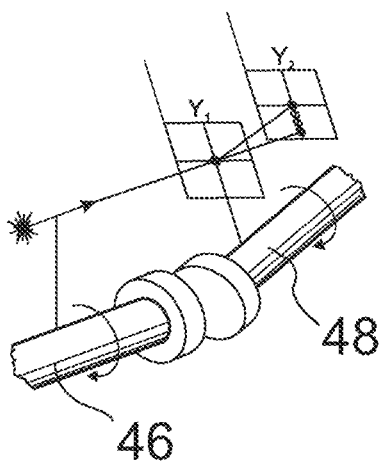
FIG. 4C a schematic illustration, respectively, for highlighting a receiver having two flat fields of view.
Figure 4C:
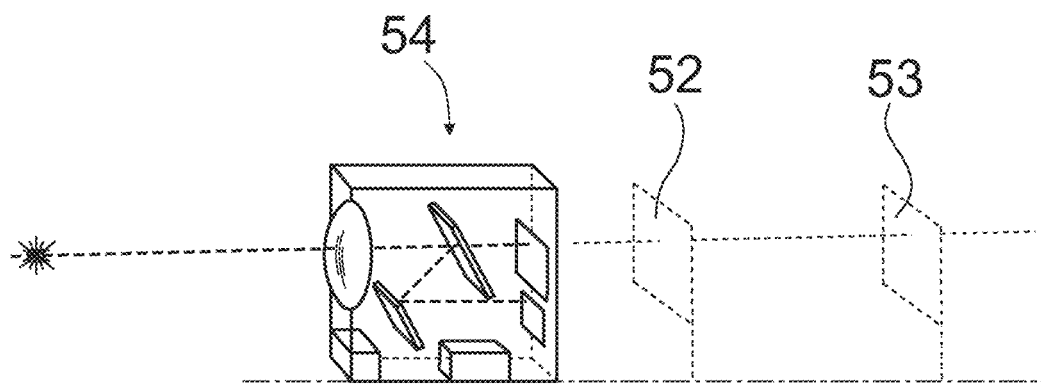

In the apparatus according to FIG. 1B, the field of view 53 is arranged virtually in the longitudinal direction of the shaft 48 (or in the direction of the axis of rotation of the shaft 48) at a spacing from the field of view 52 by means radiation splitter optics 54 (compare FIG. 4C), known as such.

It can be inferred from FIG. 6 how, in a known way on the basis of the Y coordinates thus plotted as a function of the angle of rotation, the respective different offset (compare FIGS. 4A and 4B) can be calculated by employing the respective values in the 12 o'clock, 3 o'clock, 6 o'clock, and 9 o'clock position, whereby, for the dependence of the angle of rotation in the known apparatuses, resort is had to a measurement by an inclinometer. An offset of the two shafts 28, 32 is illustrated schematically in FIG. 1A, but has a substantially greater extent in FIG. 1A for purpose of highlighting than what is to be expected in concrete practice. This applies correspondingly also to FIGS. 1B, 4A, and 4BC.

By means of the method according to the invention, however, it is possible to resort advantageously to a trajectory curve in the form of an ellipse, created without inclinometer measurement, in which the Y1 coordinates are parameterized or plotted as a function of the angle of rotation $\phi_r$. This dependence can then be transferred also to the Y2 coordinates or the dependence of the Y1 coordinates and Y2 coordinates on the angle of rotation $\phi_r$ is identical for the two fields of view 52 and 53 as a result of the principle of measurement according to FIGS. 1B and 1C. Preferably, therefore, for the two fields of view 52, 53, the curve fitting is performed and the resulting trajectory curve is used as the basis for determination of the offsets at which the positions of the laser light spot exhibit the least scatter in relation to the trajectory curve.

Figure 7A:
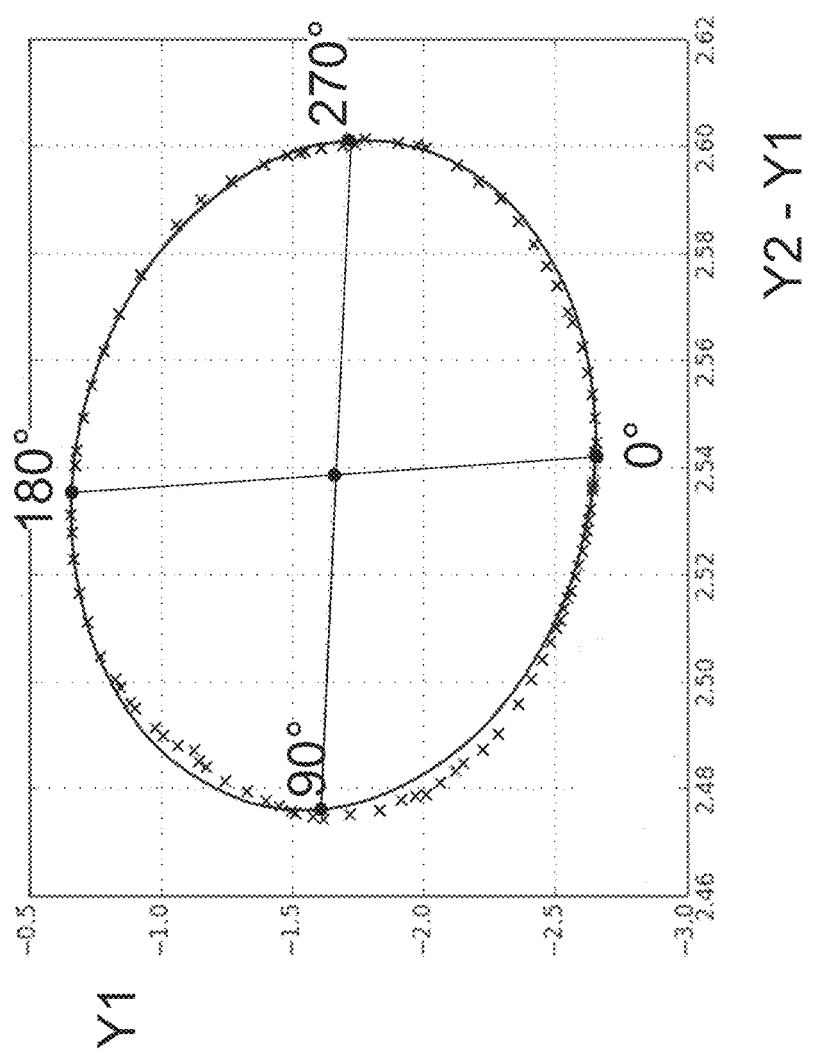
FIG. 7A an illustration in which the Y coordinates of a first field of view are plotted against the difference of the Y coordinates between a second field of view and the first field of view, together with an ellipse fit.

FIG. 7A shows an illustration in which the Y1 coordinates of the field of view 52 are plotted against the difference of Y2−Y1 together with a curve fitting in the form of an ellipse fit. The positions of the laser light spots illustrated here were obtained in a known way by a measurement in which the angle of rotation of one of the two shafts was measured by means of an inclinometer. The standard deviation of the positions or measuring points from the ellipse fit was 7.3 μm in this case, which corresponds to a good measurement. However, it was possible by means of the embodiments of the method according to the invention, which are based on the curve fitting or on an exclusive use of X coordinates or an exclusive use of Y coordinates, to reduce the standard deviation in measurements advantageously to 5.2 µm and 1.1 µm, respectively.

Figure 7B:
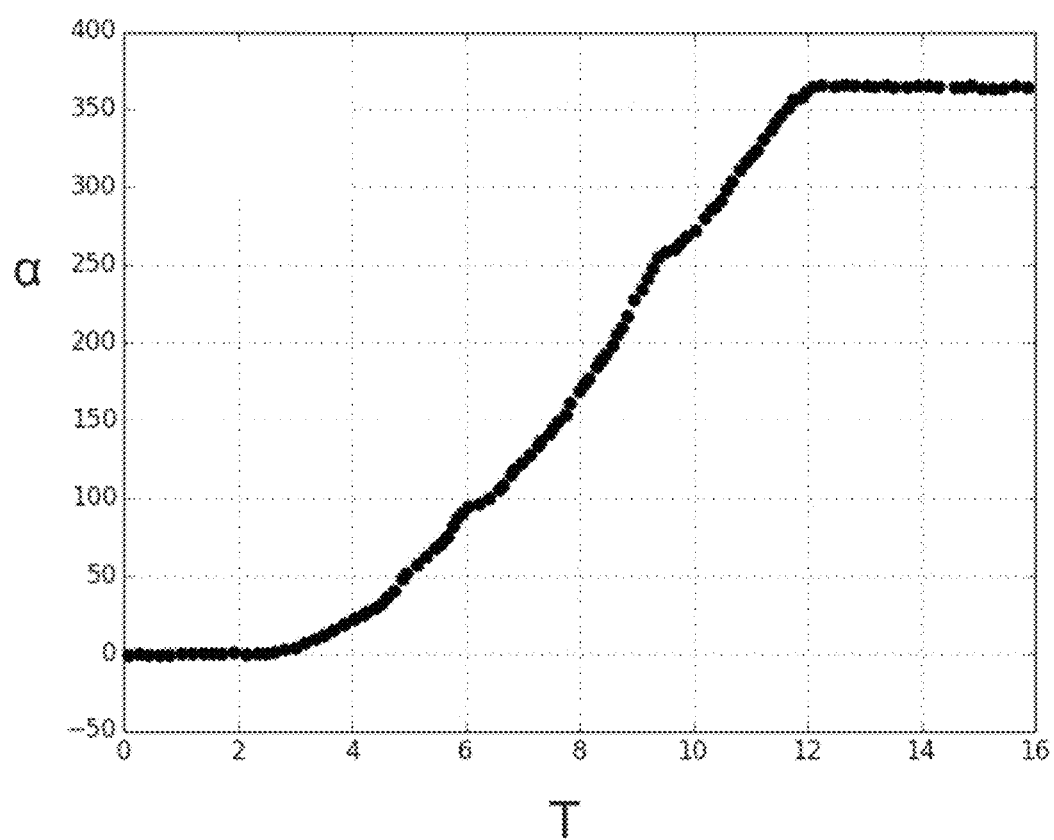
FIG. 7B an illustration of recorded angles of rotation a as a function of the time T.

FIG. 7B shows an illustration of the angles of rotation α, recorded as a function of time, which were determined by recording the angle of rotation by use of an inclinometer, on the basis of the embodiment of the method according to the invention based on curve fitting and on the basis of the embodiment of the method according to the invention that is based on the exclusive use of X coordinates or on the exclusive use of Y coordinates. All of the angles of rotation determined by these different methods lie advantageously very close to one another, which shows, in particular, that it is possible to work reliably even without an inclinometer.

Figure 8:
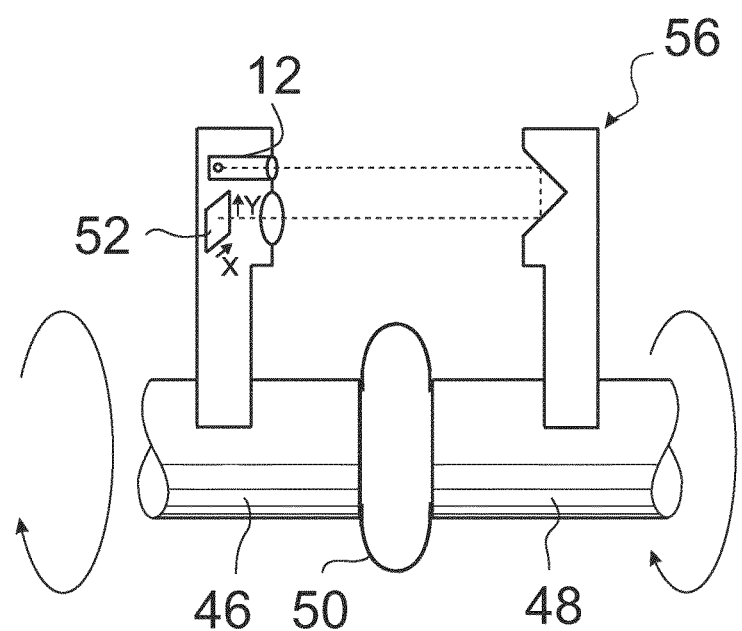
FIG. 8 a schematic illustration of a known alternative apparatus for determining the alignment of two shafts that are connected to each other via a coupling.

FIG. 8 shows a schematic illustration of a known alternative apparatus having a mirror prism 56 for determining the alignment of two shafts that are connected to each other via a coupling. It is also possible with this alternative apparatus, which is known from DE 102 36 555 A1, for example, to implement what has been described in step F, according to which, by way of the X coordinates recorded by means of the field of view 52 and/or the recorded Y coordinates, a closed trajectory curve is determined and, furthermore, on the basis of the recorded X coordinates and/or the recorded Y coordinates, a plot of the trajectory curve is determined, which is parameterized by the angle of rotation of the first or second shaft 46, 48, which is measured starting from the predetermined angle of rotation in the direction of the predetermined direction of rotation.

In particular, the above embodiments of the method according to the invention, which are based on curve fitting or on an exclusive use of X coordinates or an exclusive use of Y coordinates, can be implemented or carried out using this known alternative apparatus.

What is claimed is:

1. A method for determining a closed trajectory curve (10) by a laser (12) and a laser light sensor (14) having a flat field of view (16),
   wherein the field of view (16) has a coordinate system (18) with an X coordinate axis (20) and a Y coordinate axis (22) at a right angle to the X coordinate axis (20), wherein the laser light sensor (14) is set up so as to record, on the field of view (16), the X coordinate and Y coordinate of the position of the laser light spot (24) of the laser light beam (26) of the laser (12) impinging on the field of view (16),
   wherein the method comprises the following steps:
   A) Rotationally fixed linking of the laser (12) to a first shaft (28), which is connected to a second shaft (32) via a coupling (30), so that a rotation of the first shaft (28) can be transmitted to the second shaft (32) and vice versa;
   B) Rotationally fixed linking of the field of view (16) to the second shaft (32), with the field of view (16) being linked to the second shaft (32) in such a way that the Y coordinate axis (22) and the X coordinate axis (20) are oriented at essentially a right angle with respect to the axis of rotation (35) of the second shaft (32);
   C) Alignment of the laser (12) in such a way that the laser light beam (26), which can be generated by the laser (12), is aligned parallel to the axis of rotation (34) of the first shaft (28) and can impinge on the field of view (16);
   D) Rotation of the first or second shaft (28, 32) in a predetermined direction of rotation (42) by at least 90 degrees and irradiation of the field of view (16) with the laser light beam (26) of the laser (12) during the rotation;
   E) Recording of the X coordinates and Y coordinates of at least three positions of the laser light spot (24) on the field of view (16) by the laser light sensor (14), said positions being assumed on the field of view (16) by the laser light spot (24) during the rotation in step D;
   F) Determination of the temporally first recorded X coordinate and the temporally first recorded Y coordinate and assignment of a predetermined value of the angle of rotation to the temporally first recorded X coordinate and to the temporally first recorded Y coordinate;
   G) Determination of the closed trajectory curve (10) by means of the X coordinates recorded in step (E) and/or the Y coordinates recorded in step (E);
   wherein, in step (G), a plot of the trajectory curve (10) is further determined on the basis of the recorded X coordinates and/or the recorded Y coordinates, said plot being parameterized by the angle of rotation of the first or second shaft (28, 32) that, starting from the predetermined value of the angle of rotation, is measured in the direction of the predetermined direction of rotation.

2. The method according to claim 1, wherein the predetermined value of the angle of rotation that is assigned in step (F) to the temporally first recorded X coordinate and the temporally first recorded Y coordinate is zero degrees.

3. The method according to claim 1, wherein the closed trajectory curve (10) is an ellipse or a circle.

4. The method according to claim 1, wherein, in step (D), the first or second shaft (28, 32) is rotated by 360 degrees and, in step E, the X coordinates and Y coordinates of at least sixteen positions of the laser light spot (24) on the field of view (16) are recorded; in that, in step G, a closed trajectory curve (10), which is parameterized by the angle of rotation of the first and second shaft (28, 32), is determined in the form of an ellipse or a circle, and exclusively only the recorded Y coordinates or exclusively only the recorded X coordinates are used for determination of the parameterized trajectory curve (10).

5. The method according to claim 1, wherein, in step (D), the first or second shaft (28, 32) is rotated by at least 90 degrees and by less than 360 degrees or by essentially 180 degrees, wherein, in step E, the X coordinates and Y coordinates of at least three positions of the laser light spot (24) on the field of view (16) are recorded; wherein, in step G, a closed trajectory curve (10) is determined in the form of an ellipse or a circle by curve fitting to the recorded X coordinates and Y coordinates; and wherein, for determination of the parameterized plot of the trajectory curve (10), the angles of rotation measured starting from the predetermined value of the angle of rotation in the direction of the predetermined direction of rotation are assigned to each point on the trajectory curve (10).

6. The method according to claim 1, wherein steps (E) to (G) are performed in an automated manner.

7. An apparatus (36) for determining a closed trajectory curve (10), wherein the apparatus (36) has a laser (12), a laser light sensor (14) with a flat field of view (16), and an analysis unit (40),
   wherein the field of view (16) has a coordinate system (18) with an X coordinate axis (20) and a Y coordinate axis (22) at a right angle to the X coordinate axis (20), wherein the laser light sensor (14) is set up so as to record, on the field of view (16), the X coordinate and Y coordinate of the position of the laser light spot (24) of the laser light beam (26) of the laser (12) impinging on the field of view (16), wherein the laser (12) can be linked in a rotationally fixed manner to a first shaft (28), which is connected to a second shaft (32) via a coupling (30), so that a rotation of the first shaft (28) can be transmitted to the second shaft (32) and vice versa, wherein the field of view (16) can be linked in a rotationally fixed manner to the second shaft (32) in such a way that the Y coordinate axis (22) and the X coordinate axis (20) are oriented at essentially a right angle with respect to the axis of rotation (35) of the second shaft (32), and wherein the laser (12) can be aligned in such a way that the laser light beam (26) that can be generated by the laser (12) is aligned parallel to the axis of rotation (34) of the first shaft (28) and can impinge on the field of view (16), wherein the analysis unit (40) is set up so as to determine the temporally first recorded X coordinate and the temporally first recorded Y coordinate from the X coordinates and Y coordinates of at least three positions of the laser light spot that the laser light spot assumes on the field of view during rotation, when the first or second shaft is rotated by at least 90 degrees, and to assign these temporally first recorded coordinates to a predetermined value of the angle of rotation, wherein the analysis unit is set up so as to determine a closed trajectory curve (10) from the recorded X coordinates and/or the recorded Y coordinates, and wherein the analysis unit (40) is further set up so as to determine, on the basis of the recorded X coordinates and/or Y coordinates, a plot of the trajectory curve (10), which is parameterized by the angle of rotation of the first or second shaft (28, 32), which is measured starting from the predetermined value of the angle of rotation in the direction of the predetermined direction of rotation.

8. The apparatus (36) according to claim 7, wherein the closed trajectory curve (10) is an ellipse or a circle.

9. The apparatus (36) according to claim 7, wherein the closed trajectory curve (10) is an ellipse or a circle, and in that the analysis unit (40) is set up for determination of the trajectory curve (10) parameterized by the angle of rotation of the first or second shaft (28, 32), to use exclusively only the Y coordinates recorded for a rotation of 360 degrees or exclusively only the X coordinate recorded for a rotation of 360 degrees of at least sixteen positions of the laser light spot.

10. The apparatus according to claim 7, wherein the analysis unit (40) is configured to determine a closed trajectory curve (10) in the form of an ellipse or a circle by curve fitting to the X coordinates and Y coordinates, which are recorded when the first or second shaft (28, 32) is rotated by at least 90 degrees and by less than 360 degrees or by essentially 180 degrees, of at least three positions of the laser light spot, and in that the analysis unit (40) is further configured for determination of the parameterized plot of the trajectory curve (10), so as to assign the angle of rotation to be measured starting from the predetermined value of the angle of rotation in the direction of the predetermined direction of rotation to each point on the trajectory curve (10).

* * * * *